(12) United States Patent
Wang

(10) Patent No.: US 7,505,468 B1
(45) Date of Patent: Mar. 17, 2009

(54) METHOD AND APPARATUS FOR LOGICAL IDENTIFICATION PRIORITY

(75) Inventor: Sibing Wang, Shanghai (CN)

(73) Assignee: Integrated Device Technology, Inc., San Jose, CA (US)

( * ) Notice: Subject to any disclaimer, the term of this patent is extended or adjusted under 35 U.S.C. 154(b) by 0 days.

(21) Appl. No.: 11/857,361

(22) Filed: Sep. 18, 2007

Related U.S. Application Data

(63) Continuation of application No. 11/250,873, filed on Oct. 14, 2005.

(51) Int. Cl.
*H04L 12/28* (2006.01)

(52) U.S. Cl. .............. 370/395.42; 370/395.41; 370/412

(58) Field of Classification Search .............. None
See application file for complete search history.

(56) References Cited

U.S. PATENT DOCUMENTS

| | | | |
|---|---|---|---|
| 6,859,435 B1* | 2/2005 | Lee et al. | 370/231 |
| 6,954,466 B1 | 10/2005 | Dalleggio et al. | |
| 7,158,510 B1* | 1/2007 | Golla et al. | 370/374 |
| 7,301,906 B2* | 11/2007 | Nation et al. | 370/235 |
| 2003/0117958 A1 | 6/2003 | Nation et al. | |
| 2004/0252684 A1 | 12/2004 | Evans et al. | |
| 2005/0175014 A1* | 8/2005 | Patrick | 370/395.43 |
| 2006/0067225 A1* | 3/2006 | Fedorkow et al. | 370/235 |

* cited by examiner

*Primary Examiner*—Phirin Sam
(74) *Attorney, Agent, or Firm*—Heimlich Law; Alan Heimlich, Esq.

(57) ABSTRACT

A method and apparatus for logical identification priority have been disclosed.

6 Claims, 7 Drawing Sheets

METHOD AND APPARATUS FOR LOGICAL IDENTIFICATION PRIORITY

RELATED APPLICATION

This patent application is a continuation of, and claims priority of, U.S. application Ser. No. 11/250,873 filed Oct. 14, 2005 titled "Method and Apparatus for generic interface, packet cut-through, overbooking, queue concatenation, and logical identification priority for a System Packet Interface device", which is hereby incorporated herein by reference, which claims priority of U.S. Provisional Application Ser. No. 60/619,234 filed Oct. 15, 2004 titled "Method and Apparatus for generic interface, packet cut-through, overbooking, queue concatenation, and logical identification priority for a System Packet Interface device", which is hereby incorporated herein by reference.

FIELD OF THE INVENTION

The present invention pertains to priority of data. More particularly, the present invention relates to a method and apparatus for Logical IDentification (LID) Priority.

BACKGROUND OF THE INVENTION

Priority as to what data should be sent when is often used in communications, data processing applications, computing, etc. particularly where data or data streams may be "bursty" in nature and some sort of priority is needed to ensure acceptable deliver times or quality of service (QOS) requirements.

A current approach is to use round robin or weighted round robin in an attempt to set priority. Additionally, other approaches use "feedback" signals such as "starving", "hungry", and "satisfied" to convey from a receiving entity to a transmitting entity the current state of data needs. Priority based solely on these approaches may not be able to adapt to the changing data streams or accommodate logical connections and data flow that is established. This may present a problem.

BRIEF DESCRIPTION OF THE DRAWINGS

The invention is illustrated by way of example and not limitation in the figures of the accompanying drawings in which.

DETAILED DESCRIPTION

The present invention as embodied in one embodiment of a device may be used in a variety of flow control applications, for example, for packet processing. A packet-exchange device solves a myriad of interconnect problems in networking markets. For example, in one embodiment logical identification priority offers options for egress server priority for a System Packet Interface (SPI) device.

Figure 3:
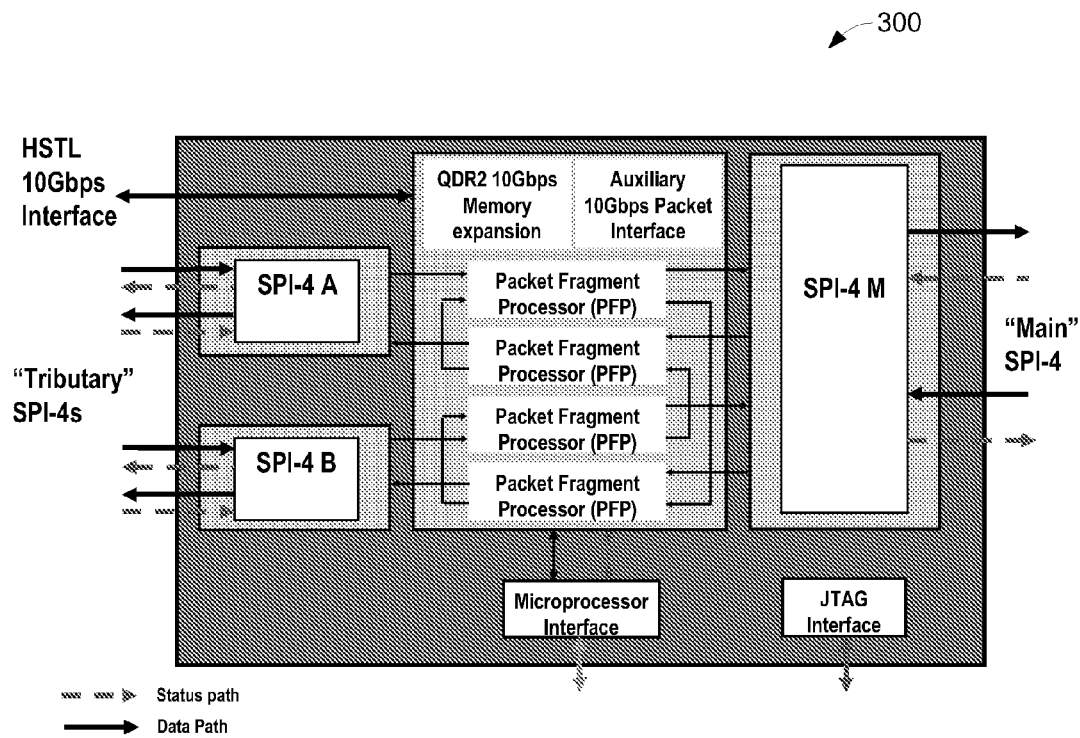
FIG. 3 illustrates one embodiment of the present invention in block diagram form.

FIG. 3 illustrates, generally at 300, one embodiment of the present invention in block diagram form. Shown in the block diagram are four packet fragment processors (PFPs). As may be seen the PFPs interface to multiple SPI interfaces.

Figure 4:
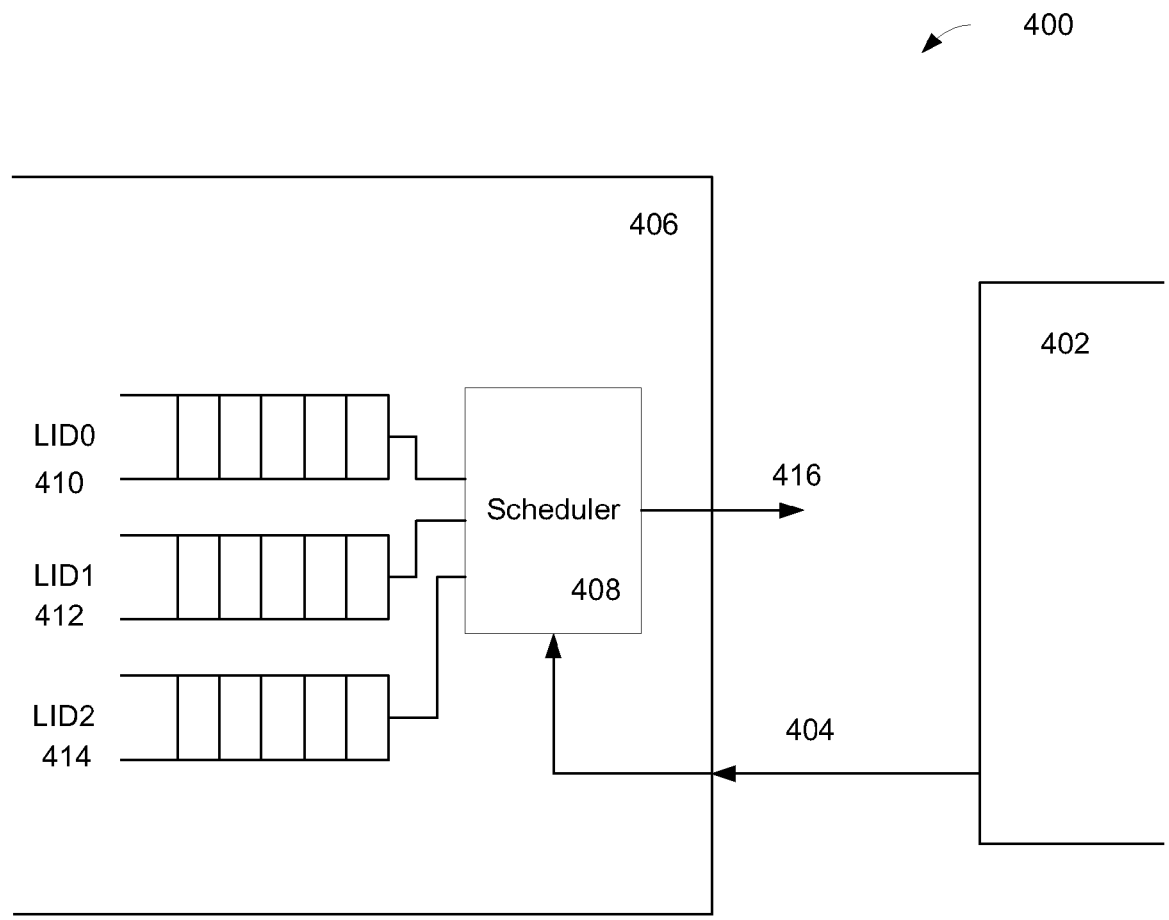
FIG. 4 illustrates one embodiment of the invention showing LID priority.

FIG. 4 illustrates, generally at 400, one embodiment of the invention showing LID priority. At 402 is a device which sends a status, such as, hungry, starving, and satisfied per port via link 404 to block 406 and into a scheduler 408 which has as inputs, in this example, 3 logical ports, LID0, LID1, and LID2 (410, 412, and 414 respectively). In another embodiment of the invention there are 64 LIDs. Each LID is given a 2 level priority for use by the scheduler (408). In this way, the scheduler 408 may use a round robin for a local based priority. For example, assume that priority A is higher than priority B. Assume that LID0 410 has a B priority and LID1 412 and LID2 414 are each at priority A. Scheduler 408 would then proceed to schedule LID1 412 and LID2 414 before LID0 410. When LID1 412 and LID2 414 are completed, then the scheduler 408 would handle LID0 410. 416 represents the output of the scheduler 408.

Figure 5:
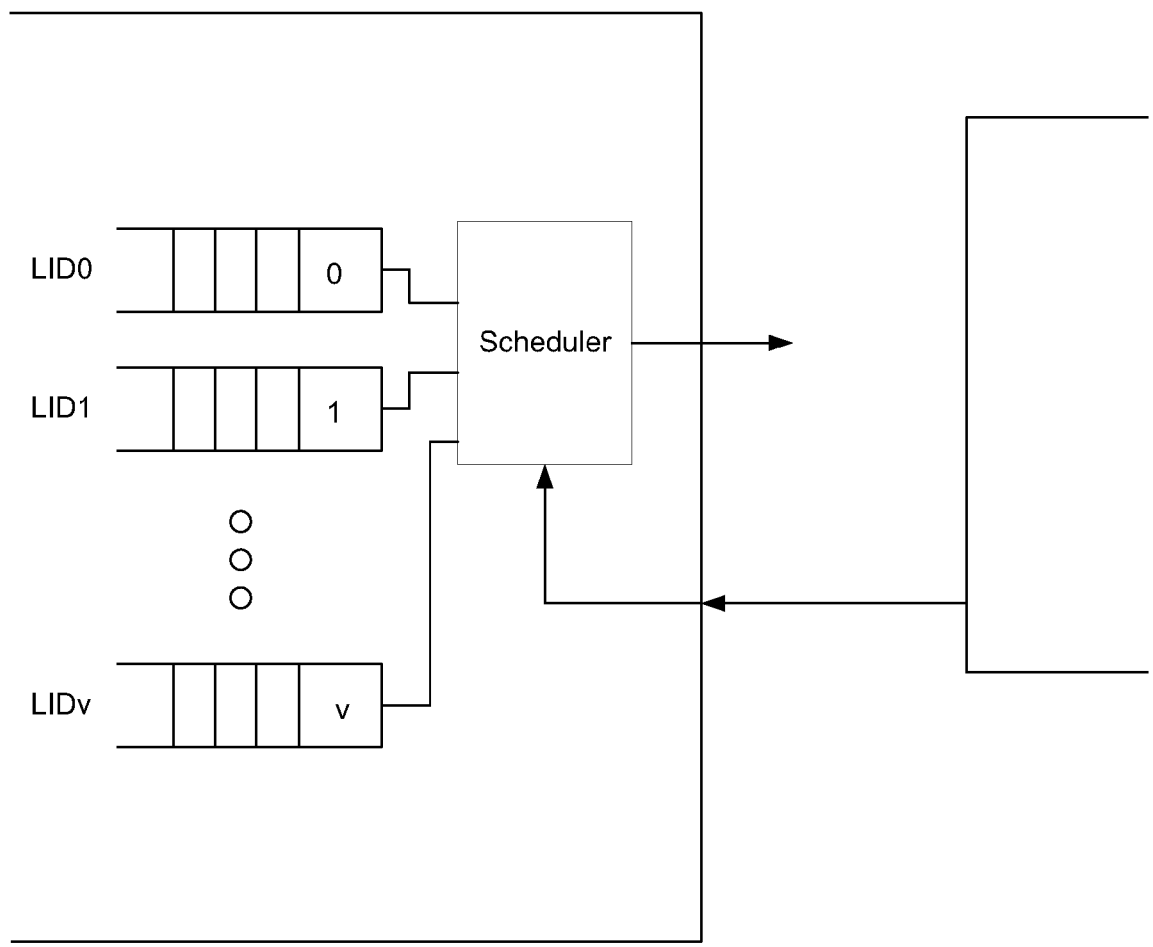
FIG. 5 illustrates one embodiment of the invention.

FIG. 5 illustrates, generally at 500, one embodiment of the invention. The invention may have any number of LIDs. For example, as shown in FIG. 5, where v=63.

In one embodiment of the invention, there is an egress server defined 2-level priority associated with each LID and queues with the same priority are served in round robin.

In one embodiment of the invention, the egress server, for example, Scheduler in FIG. 4 at 408, may serve a queue with a 2-level priority in packet mode or cut-though mode. The egress server would load data from a data memory, generate a transfer with a defined transfer size, and then dispatch it to a desired data path. Queues with the same priority may be served, in one embodiment, in round robin.

Figure 6:
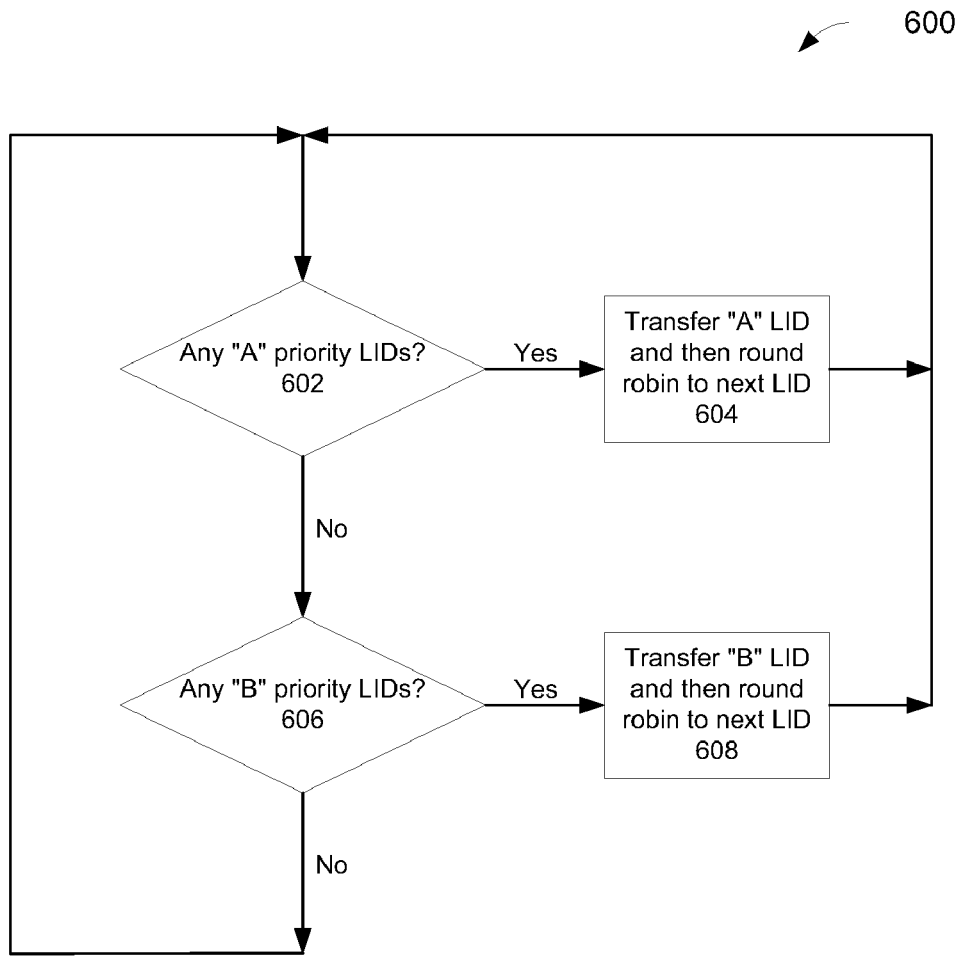
FIG. 6 illustrates one embodiment of the invention in flow chart form.

FIG. 6 illustrates, generally at 600, one embodiment of the invention showing a 2-level priority ("A" being higher priority than "B") approach in flow chart form. At 602 a check is made to see if there are any "A" priority LIDs, if so then at 604 the A priority LID is transferred and round robin points to the next LID, and the process continues at 602. If there are no A priority LIDs, then at 606 a check is made to see if there are any "B" priority LIDs, if so then at 608 the B priority LID is transferred and round robin points to the next LID, and the process continues at 602. If there are no B priority LIDs, then the process continues at 602. In this approach all A priority LIDs are served in round robin and when completed B priority LIDs are served in round robin as long as there are no A priority LIDs pending.

Figure 7:
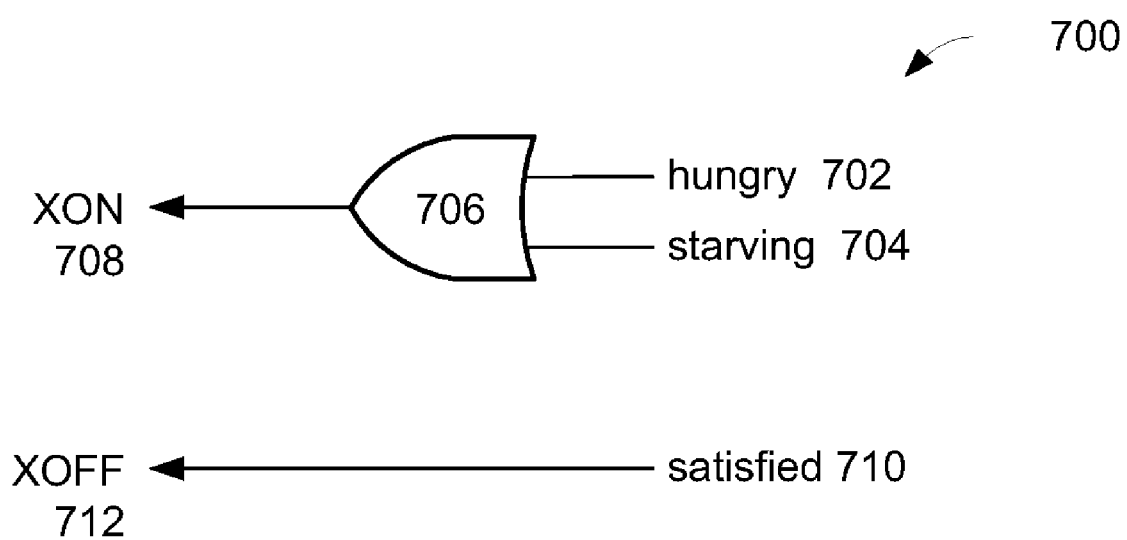
FIG. 7 illustrates one embodiment of the invention showing level status.

FIG. 7 illustrates, generally at 700, one embodiment of the invention. Here a three level status is translated into a two level status. For example, a "satisfied" 710 would be unmodified and may generate a signal such as XOFF 712. A status of "hungry" 702 and "starved" 704 would be modified (via, for example, a logical OR 706, hungry OR starved) into a signal such as XON 708. The XON 708 and XOFF 712 may be used as controls for round robin local priority.

What is to be appreciated is that the present invention allows priority to be based on LIDs.

One of skill in the art will understand that the approach may be expanded and LIDs may have associated with them more levels of priority and that dynamic reconfiguration of levels of priority is also possible. For example, rather than having a fixed LID priority of say two, depending on the traffic, a 3, 4, or even more priority scheme may be set up.

Thus a method and apparatus for logical identification priority have been described.

Figure 1:
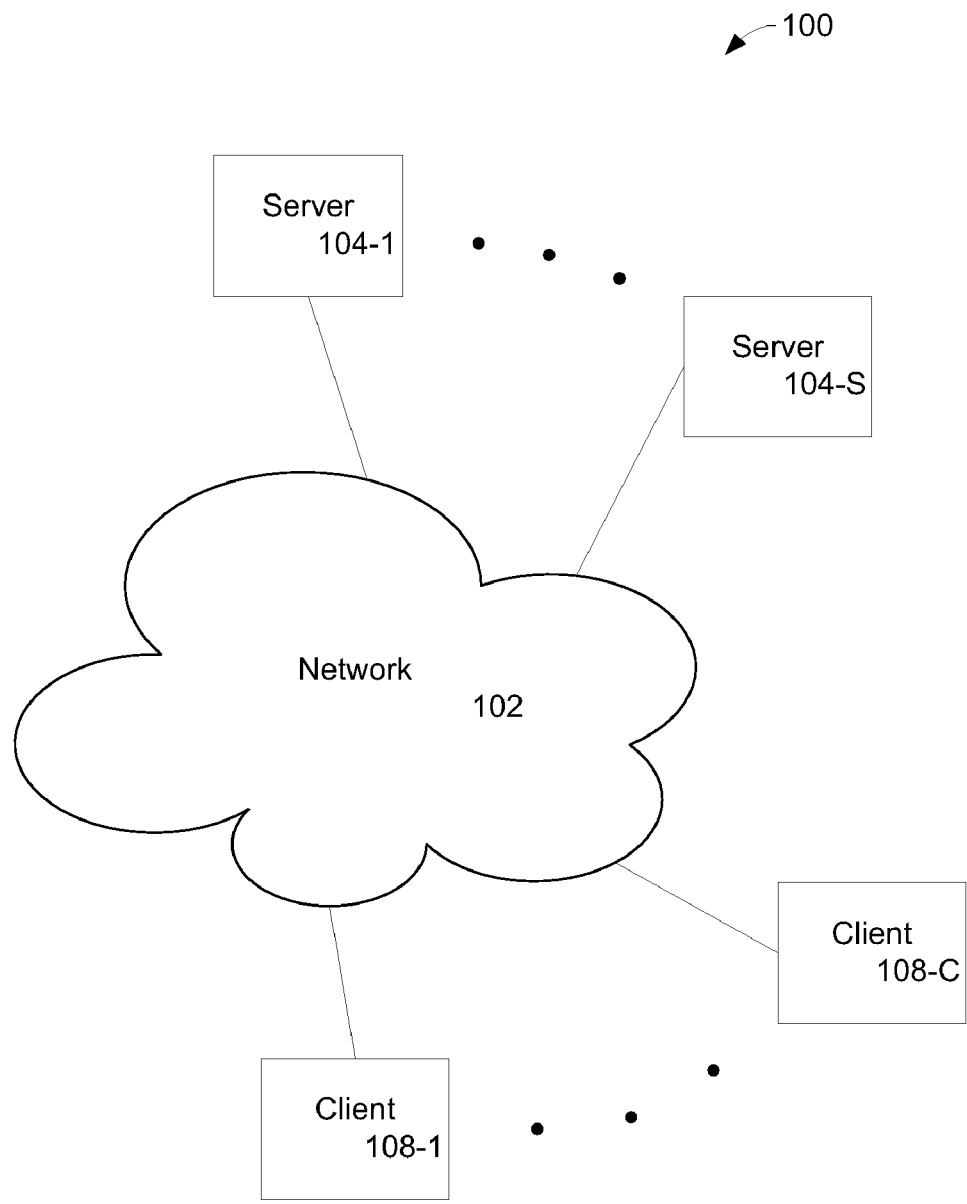
FIG. 1 illustrates a network environment in which embodiment(s) of the invention may be used.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
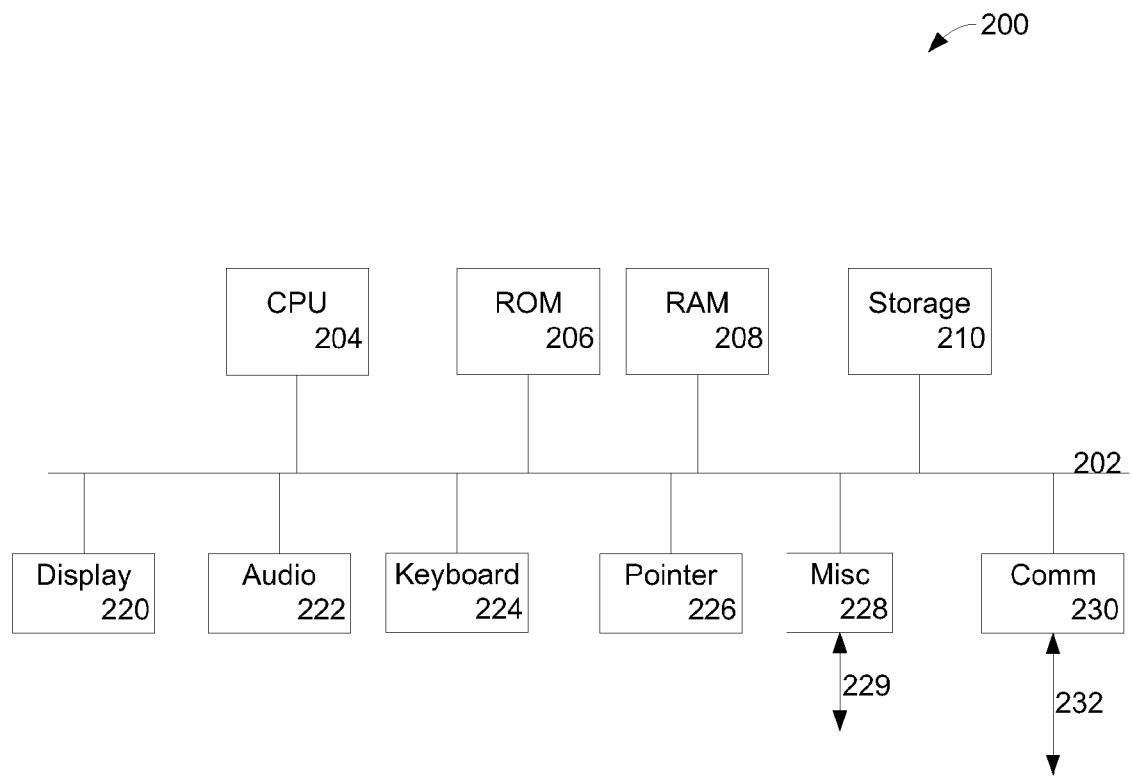
FIG. 2 is a block diagram of a computer system in which embodiment(s) of the invention may be used.

FIG. 2 is a block diagram of a computer system 200 in which some embodiments of the invention may be used and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, CPU, etc. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. CPU 204 might use, for example, an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals which when received cause physical movement in matter (e.g. electrons, atoms, etc.) (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Reference has been made to "SPI", "SPI-4", and similar terms. One of skill in the art will understand that this refers to the System Packet Interface and the specification as published by the Optical Internetworking Forum (OIF). Such specifications may be obtained from the OIF at http://www.oiforum.com/. One of skill in the art is considered familiar with the SPI specification.

Reference has been made to "LID", and similar terms. One of skill in the art will understand that a LID refers to an associated logical data flow (which is identified by the LID). This data flow may be directed to/from destinations, such as, but not limited to, packet fragment processors. Additionally one of skill in the art will understand that a logical port (LP) is a distinct concept from a LID.

Thus a method and apparatus for logical identification priority have been described.

What is claimed is:

1. A method comprising:
   converting a three level status signal into a two level status signal;
   receiving said two level status signal;
   determining if one or more data flows have a priority associated with said two level status signal; and
   scheduling said one or more data flows according to said priority associated with said two level status signal.

2. The method of claim 1 wherein said scheduling further comprises serving in round robin.

3. The method of claim 2 wherein said serving is associated with a specific logical identification.

4. An apparatus comprising:
   means for converting a three level status signal into a two level status signal;
   means for receiving said two level status signal;
   means for determining if one or more data flows have a priority associated with said two level status signal; and
   means for scheduling said one or more data flows according to said priority associated with said two level status signal.

5. The apparatus of claim 4 wherein said means for scheduling further comprises means for serving in round robin.

6. The apparatus of claim 5 wherein said means for serving is associated with a specific logical identification.

* * * * *